C. H. COLVIN.
MAGNETIC COMPASS.
APPLICATION FILED SEPT. 26, 1918.
1,431,776.
Patented Oct. 10, 1922.
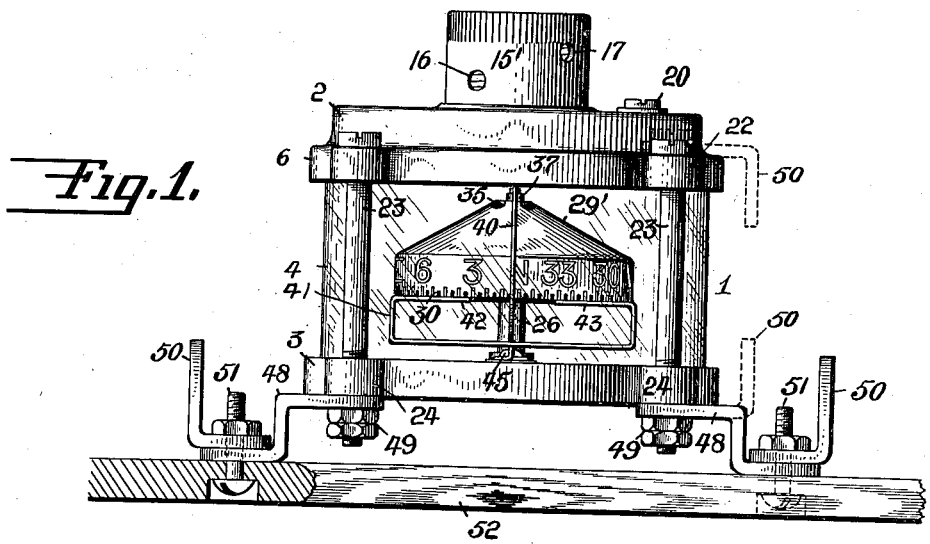
Fig. 1.
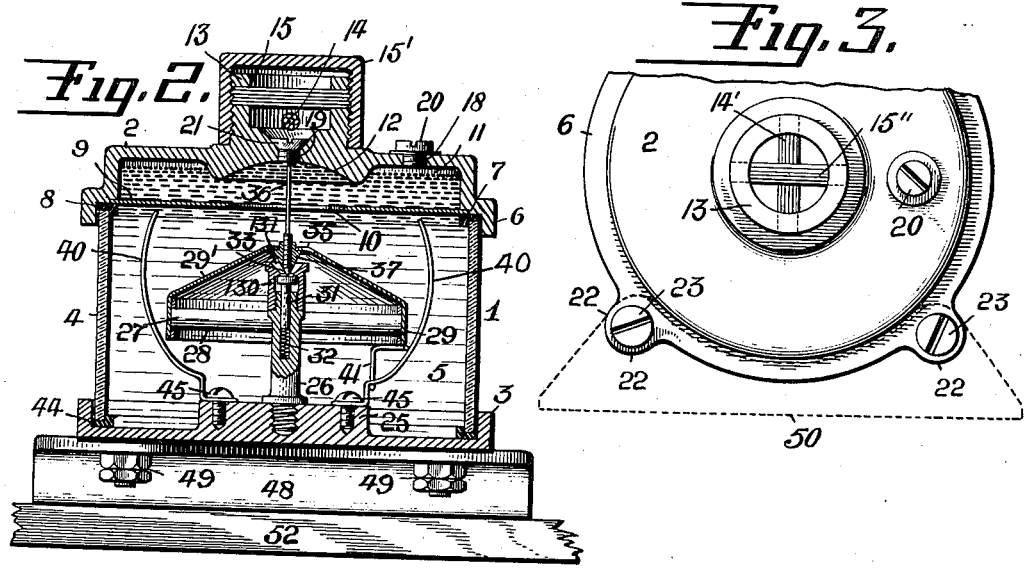
Fig. 2.
Fig. 3.
INVENTOR
Charles H. Colvin.
BY Herbert H. Thompson
his ATTORNEY Patented Oct. 10, 1922.

1,431,776

UNITED STATES PATENT OFFICE.

CHARLES H. COLVIN, OF EAST ORANGE, NEW JERSEY, ASSIGNOR TO THE SPERRY GYROSCOPE COMPANY, OF BROOKLYN, NEW YORK, A CORPORATION OF NEW YORK.

MAGNETIC COMPASS.

Application filed September 26, 1918. Serial No. 255,746.

*To all whom it may concern:*

Be it known that I, CHARLES H. COLVIN, a citizen of the United States of America, residing at 56 North Maple Avenue, East Orange, in the county of Essex and State of New Jersey, have invented certain new and useful Improvements in Magnetic Compasses, of which the following is a specification.

This invention relates to magnetic compasses especially adapted for use on aircraft, the object of the invention being to produce a compact device of less weight and greater visibility than compasses now known in the art.

Fig. 1 is a side elevation of one form of compass.

Fig. 2 is a vertical section of the same through the center thereof.

Fig. 3 is a plan view of the same with the screw threaded cap removed.

As shown the compass comprises a casing 1, composed of upper and lower end plates 2 and 3, and an intermediate, transparent portion 4. The central portion is preferably made entirely of glass and cylindrical in form so that the graduations on the compass may be seen clearly and in order that the graduations may be magnified. The magnification is further increased by filling the casing with a liquid 5 such as water, or alcohol, or a mixture of the two. The upper end plate is provided with a flange 6 and shoulder 7 against which the transparent intermediate portion is clamped. Preferably packing 8 and also a partition 9 are clamped between the transparent portion and the end member. The partition is annular in form, being provided with a central opening 10. The opening is sufficiently small to prevent the air bubbles 11, which normally remain above the liquid and between it and the top plate, from escaping through the opening, unless the compass is tipped through an excessive angle. It will be readily seen that by this simple means no expansion chamber such as usually provided on compasses is necessary, since the said chamber is rendered unnecessary by the simple expedient of leaving an air space within the casing and so constructing the compass that the air bubbles 11 are invisible, with the compass in all normal positions, and do not disturb the compass card.

The top member may also be provided with a hollowed out or dome shaped portion 12 for a purpose hereinafter explained. Rising from the top is a threaded portion 13 having one or more apertures 14 and 15 extending through both walls thereof. Preferably said apertures are at right angles to one another. A cap 15′, screwed or otherwise detachably secured to the stem 13, closes the apertures. The cap may also be provided with apertures 16 and 17 designed to register with the aforesaid apertures in a certain position of the cap. Compensating magnets 14′ and 15″ are placed within the said apertures and locked therewithin by rotation of the cap 15′ as will be readily apparent. By adjusting the relative number of small magnets in each aperture the errors of the compass, due to the metallic parts of the aeroplane or to other disturbances may be compensated for.

Openings 18 and 19 normally closed by set screws 20 and 21 may be provided in the top member in order to fill the casing without taking the same apart. The top member 2 is shown as provided with ears 22 through which bolts 23 extend. Said bolts extend through corresponding ears 24 on the bottom plate and firmly clamp the transparent intermediate portion 4 between the two end plates 2 and 3 as will be readily apparent.

Upon a boss 25 on the base plate may be conveniently supported a stem 26 carrying the magnetic element or elements 27. The magnetic elements are shown in the form of magnetized bars 28 clamped within a ring 29 supported by a dome shaped card or rose 29′. The graduations 30 are preferably placed upon the periphery of said card so that the same may be read from the side. Within the stem 26 a pin 31 is resiliently supported on a spring 32. A detachable sleeve 130 having a flaring top 131 is shown to retain pin 31 in place and to aid in keeping point 33 on its seat. Upon a jewel (not shown) on the top of said pin rests the hardened point 33 of the compass rose 29′. The center of gravity of the rose as a whole is of course below point 33, due principally to the weight of magnets 28 and ring 29. Said rose may be provided adjacent its top with small openings 35 adapted to permit air bubbles to escape therethrough, in case air should become trapped under the dome-shaped card. Rising from said card is a stem 36 which may be threaded into central boss 37 as is shown. Said stem extends to a point close to the curved portion 12 of the top member described above, and is for the purpose of preventing the compass rose from falling off the pivot in case the compass is tilted or turned upside down. The walls of the aperture 10 in the partition 9 also serve as a stop against which the stem is adapted to strike when the compass is tilted more than the desired angle. To the boss at the base is also secured one or more index wires 40 which rise from the boss and curve around the card. Another wire or wires 41 may also be employed if desired. Said wire is shown as soldered or otherwise secured near the base of one of wires 40 extending laterally with end portions 42 and 43 folded inwardly approximately in line with the lower edge of the card. Preferably the end portions terminate at equal distances from the index wire 40. By means of the wire 41 the compass also acts as an inclinometer disclosing to the aviator whether or not he is flying on even keel, since in case he should not be doing so the ends 42 and 43 would either become inclined with respect to the card or move above or below the underneath edge of the card, depending upon the direction of tilt of the aeroplane. Both the markings on the card and the index wires may be painted with luminous or radium paint if desired. Packing 44 is also provided between the lower part and the intermediate portion. The index wires are shown as clamped to the boss 25 by set screws 45 while the stem 26 is screwed within the boss.

As illustrated in full lines, the compass is mounted on a base ready for shipment. For this purpose angle bars 48 are clamped to the bolts 23 by nuts 49. Extra angle plates 50 are shown as clamped to plates 48 by bolts 51 which bolts also serve to secure the compass to the base 52. If it is desired to secure the compass to the dash board of an aeroplane for instance, the angle plates 48 and 50 are removed from their present positions and the two plates 50 clamped to the upper and lower ends of the bolts as illustrated in dotted lines.

Having described my invention, what I claim and desire to secure by Letters Patent is:

1. A compass comprising a base member, a cylindrical glass intermediate portion, a top member, means for clamping said glass portion between said two members, a post supported on said base member, and a compass rose pivotally supported on the top of said post, said rose having a substantially cylindrical graduated portion extending downwardly below the top of said post.

2. A compass comprising a base member, a cylindrical glass intermediate portion, a top member, means for clamping said glass portion between said two members, a post supported on said base member, a compass rose pivotally supported on the top of said post, said rose having a substantially cylindrical graduated portion extending downwardly below the top of said post, and magnets secured across said cylindrical portion with their center of gravity below the pivot support of said rose.

3. A compass comprising a transparent portion and end members comprising a casing adapted to be filled with a liquid, a partition having a central opening therein and secured adjacent the top of said transparent portion, a side reading card rotatably supported within said casing, a stem rising from the center of said card, the upper end member having a curved portion thereabove, and the walls of said opening in the partition acting as a stop to limit the angle of tilt of the card.

4. A compass comprising a cylindrical casing having transparent sides, a partition having a centrally located opening therethrough and secured adjacent the top of said casing, whereby air bubbles may be trapped in the top of said casing and a compass rose pivotally mounted in said casing.

5. A compass comprising a cylindrically-shaped container having transparent sides and adapted to be filled with a liquid, a separate chamber adjacent the top of said container and communicating therewith, a side reading compass card rotatably mounted within said container and means for preventing said card from falling out of said mounting.

6. A compass comprising a base member, a cylindrical glass intermediate portion, a top member, rods for clamping said glass portion between said two members, a compass rose, means connected to said base member whereby said rose is universally pivoted, and an index member secured to one of said members and extending adjacent said rose.

7. A compass comprising a base member, a cylindrical glass intermediate portion, a top member, means for clamping said glass portion between said two members, a compass rose, means connected to said base member whereby said rose is pivotally supported, and means for indicating the inclination of the compass with respect to the rose.

8. A compass comprising a base plate, a cylindrical glass intermediate portion, a top plate, means for clamping said glass portion between said two plates, a compass rose, means connected to said base plate whereby said rose is pivotally supported, and means for indicating the inclination of the compass in a plurality of planes with respect to the rose.

9. The combination with a side reading compass casing, of a compass rose therein, means connected to said casing whereby said rose is universally supported, the center of gravity of said rose being below its point of support, and means visible through the side of the casing for indicating relative inclination of the rose and casing.

10. A compass comprising a base member, a cylindrical glass intermediate portion, a top member, rods for clamping said glass portion between said two members, a compass rose, means connected to the base member whereby said rose is universally pivoted, and an index member secured to one of said members and extending adjacent said rose.

11. A compass comprising a base member, a cylindrical glass intermediate portion, a top member, means for clamping said glass portion between said two members, a compass rose, means connected to the base member whereby said rose is pivotally supported, and means whereby the position of said rose indicates the inclination of said compass.

12. A compass comprising a base plate, a cylindrical glass intermediate portion, a top plate, means for clamping said glass portion between said two plates, a compass rose, means connected to the base plate whereby said rose is pivotally supported, and means whereby the position of said rose indicates the inclination of said compass.

13. A magnetic compass comprising a bowl having transparent sides, a pivot post within the bowl, a float universally pivoted on said post, and means forming a horizontal lubber line carried by the bowl and having its horizontal portion adjacent said float for indicating the inclination of the compass.

14. A magnetic compass having a bowl provided with transparent sides, a pivot post in the bowl, a compass float universally pivoted on said post, means forming vertical lubber lines within said bowl, and means forming horizontal lubber lines within the bowl adjacent the float for indicating the inclination of the compass.

In testimony whereof I have affixed my signature.

CHARLES H. COLVIN.